Nov. 8, 1927.
J. D. RICHIE
CHAIN CONNECTER
Filed Nov. 17, 1926
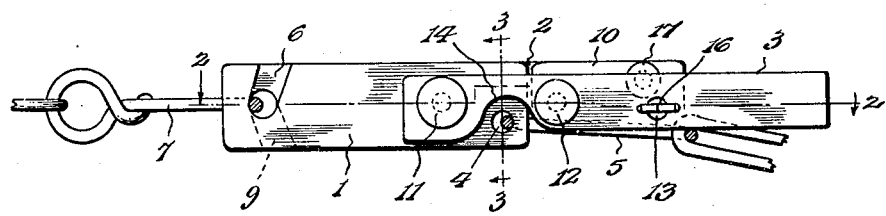
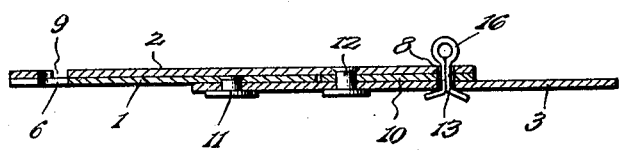
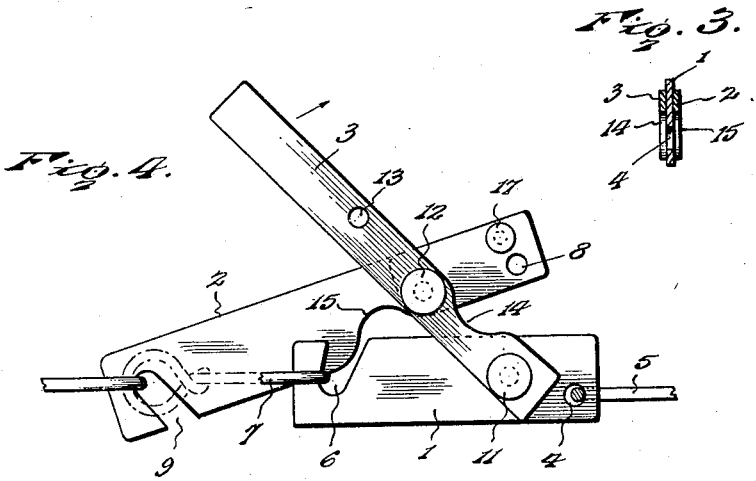
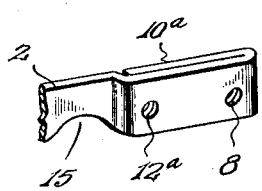
Inventor
J. D. Richie.
By Lacey & Lacey, Attorneys Patented Nov. 8, 1927.

1,648,507

UNITED STATES PATENT OFFICE.

JOSEPH D. RICHIE, OF CASPER, WYOMING.

CHAIN CONNECTER.

Application filed November 17, 1926. Serial No. 148,890.

The invention provides an article designed for general use in connecting chains and taking up slack therein, being particularly adapted for use in connection with tire chains, log chains and binders of analogous nature requiring to be connected and frequently to be drawn together to take up slack preliminary to the coupling.

The invention supplies an article of the character aforesaid comprising essentially three parts, a coupler for connecting the chain or like part, a latch constituting a lock and a tightener for drawing the ends of the chain together when taking up slack therein, and an operating lever forming connecting means between the coupler and the latch and providing means for moving the latch when tightening the chain or like part to be connected or tightened.

While the drawings illustrate a preferred embodiment of the invention, it is to be understood that in adapting the means to meet specific needs and requirements, the design may be varied and such other changes in the minor details of construction, may be resorted to within the scope of the invention as claimed, without departing from the spirit thereof.

For a full understanding of the invention and the merits thereof, reference is to be had to the following description and the drawings hereto attached, in which,—

Figure 1 is a side view of a connecter for chains and the like, embodying the invention, Figure 2 is a sectional view on the line 2—2 of Figure 1, Figure 3 is a transverse sectional view on the line 3—3 of Figure 1, Figure 4 is an elevational view showing the manner of operation, and Figure 5 is a detail view of a modification.

Corresponding and like parts are referred to in the following description and designated in the several views of the drawings by like reference characters.

The connecter comprises a coupler 1, a latch 2, and an operating lever 3. These parts preferably consist of flat strips or bars, and may be struck from sheet metal or strap iron of proper gage. The coupler 1 is provided at one end with an opening 4 to receive a link 5 of a chain or like part to be connected. An inclined notch 6 is formed in an edge portion of the coupler 1 adjacent the opposite end and is adapted to receive a link 7 of the chain or part to be coupled. The latch 2 is provided at one end with an opening 8 and at its opposite end with an inclined notch 9, which is adapted to register with the inclined notch 6 of the coupler 1, when the parts occupy an operative position, substantially as indicated in Figures 1 and 2. The notches 6 and 9 are oppositely inclined and are reversely disposed so that their open ends are closed when the parts 1 and 2 are adjusted to lie one against the other, as indicated most clearly in Figure 1. The notches 6 and 9 are of a depth to provide an opening to accommodate the link 7 when the parts 1 and 2 are moved to an overlapping position. The coupler 1 is of a less length than the latch 2 and an end portion of the latter is thickened, as indicated at 10, so that the outer sides of the thickened portion and the coupler are about flush when the parts 1 and 2 are adjusted to lie one against the other.

The operating lever 3 is pivoted at one end to an end portion of the coupler 1, as indicated at 11, and is pivoted intermediate its ends to the latch 2, as indicated at 12, and has an opening 13 formed therein in position to register with the opening 8 of the latch 2 when the parts are in overlying position. An edge portion of the lever 3 intermediate the pivot connections 11 and 12 is cut away, as indicated at 14, to clear that portion of the link 5 engaging the opening 4 of the coupler 1. An edge portion of the latch 2 adjacent the pivot fastening 12 is cut away, as indicated at 15 for a like purpose. When the several parts are adjusted into overlying position, as indicated in Figure 1, the cut away portions 14 and 15 register and clear the end portion of the link 5 passing through the opening 4 of the part 1. In this position of the parts the openings 8 and 13 are in registering position and receive a cotter pin 16, as indicated most clearly in Figure 2, thereby securing the parts in operative position.

When the parts of the connecter are in operative position, they appear substantially as indicated in Figures 1 and 2, that is, they overlie or are disposed one beside the other, and are retained in place by means of the cotter pin 16, or other suitable fastening passing through the registering openings 8 and 13. When the fastening 16 is removed the lever 3 may be operated to move the latch 2, it being understood that the coupler 1, is permanently attached at one end to one of the parts to be connected. When the end of the lever 3 is swung upwardly and forwardly, as indicated in Figure 4, the notched end 9 of the latch 2 may be engaged with the links of the chain, or analogous parts to be coupled, and upon moving the lever 3 in a reverse direction, the latch 2 is drawn towards the coupler 1, thereby drawing the links 5 and 7 together, and in a continued movement of the lever 3, it finally reaches a position substantially as indicated in Figure 1, with the several parts 1, 2 and 3 in alinement and lying one beside the other, and when the cotter pin 16, or like fastening, is placed in position, the parts are made secure. The end portion of the latch 2 may be thickened, as indicated at 10, by applying a plate thereto, or by folding an end portion of the strip from which the latch 2 is formed. When the part 10 is separate it may be secured to the body of the latch by means of the pivot fastening 12 and a rivet 17.

As shown in Figure 5 the folded end portion 10ᵃ of the strip is disposed upon the outer side of the latch. The rivet receiving opening 12ᵃ and the link receiving opening 8 extend through the strip and the folded end portion thereof. This simplifies, cheapens and renders the construction more durable and does away with the rivet 17.

Having thus described the invention, I claim:

1. A connecter of the character specified, comprising a coupler, having a notch at one end, a latch having a reverse notch at one end, and provided with an opening at its opposite end, an operating lever pivoted at one end to the coupler opposite the notched end thereof, and pivoted to the latch adjacent the end having the opening, and provided with an opening in position to register with the opening of the latch when the parts occupy an overlying position, and a fastening adapted to pass through the registering openings of the latch and operating lever.

2. A connecter comprising a coupler having an opening at one end, and a notch at the opposite end, a latch having an end portion thickened and formed with an opening, and having a notch in its opposite end reversely disposed to the notch in the coupler, an operating lever pivoted at one end to the end portion of the coupler having the opening, and pivoted intermediate its ends to the thickened end of the latch, and having an opening to register with the opening in the thickened end of the latch when the parts occupy a side-by-side position, opposite edge portions of the latch and lever being cut away to register with the openings of the coupler, and a fastening adapted to pass through the registering openings of the latch and lever to secure the parts in operative position.

In testimony whereof I affix my signature.

JOSEPH D. RICHIE. [L. S.]